(12) United States Patent
Luo et al.

(10) Patent No.: US 12,510,707 B2
(45) Date of Patent: Dec. 30, 2025

(54) TOTAL OR LOCAL THICKNESS VARIATION FOR OPTICAL DEVICES

(71) Applicant: Applied Materials, Inc., Santa Clara, CA (US)

(72) Inventors: Yingdong Luo, Newark, CA (US); Zhengping Yao, Cupertino, CA (US); Daihua Zhang, Los Altos, CA (US); David Alexander Sell, Santa Clara, CA (US); Jingyi Yang, Santa Clara, CA (US); Xiaopei Deng, San Jose, CA (US); Kevin Messer, Mountain View, CA (US); Samarth Bhargava, Saratoga, CA (US); Rami Hourani, Santa Clara, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 273 days.

(21) Appl. No.: 18/381,604

(22) Filed: Oct. 18, 2023

(65) Prior Publication Data
US 2024/0126012 A1    Apr. 18, 2024

Related U.S. Application Data

(60) Provisional application No. 63/380,003, filed on Oct. 18, 2022.

(51) Int. Cl.
*G02B 6/122* (2006.01)
*G02B 6/12* (2006.01)
(Continued)

(52) U.S. Cl.
CPC ....... *G02B 6/1228* (2013.01); *G02B 6/12004* (2013.01); *G02B 6/124* (2013.01); *G02B 6/13* (2013.01); *G02B 27/0081* (2013.01)

(58) Field of Classification Search
CPC ........ G02B 6/13; G02B 6/124; G02B 6/1228; G02B 6/12004; G02B 27/0081; G02B 27/0172
See application file for complete search history.

(56) References Cited

U.S. PATENT DOCUMENTS 6,084,997 A     7/2000 Utaka et al.
9,239,432 B2 *  1/2016 Frish ................. G02B 6/13
(Continued)

FOREIGN PATENT DOCUMENTS

TW      200300504 A      6/2003

OTHER PUBLICATIONS

International Search Report and Written Opinion dated Feb. 7, 2024 for Application No. PCT/US2023/035423.
(Continued)

*Primary Examiner* — Michael P Mooney
(74) *Attorney, Agent, or Firm* — Patterson + Sheridan, LLP (57) ABSTRACT

Embodiments of the present disclosure generally relate to methods for forming a waveguide. Methods may include measuring a waveguide substrate, the waveguide having a substrate thickness distribution; and depositing an index-matched layer onto a surface of the waveguide, the index-matched layer having a first surface disposed on the waveguide substrate and a second surface opposing the first surface, wherein the index-matched layer is disposed only over a portion of the waveguide substrate, and a device slope of a second surface of the index-matched layer is substantially the same as the waveguide slope of the first surface of the waveguide.

20 Claims, 8 Drawing Sheets

(51) Int. Cl.
    *G02B 6/124*     (2006.01)
    *G02B 6/13*     (2006.01)
    *G02B 27/00*     (2006.01)

(56) References Cited

U.S. PATENT DOCUMENTS

| | | |
|---|---|---|
| 2002/0135778 A1 | 9/2002 | Folta et al. |
| 2017/0045666 A1 | 2/2017 | Vasylyev |
| 2018/0081084 A1 | 3/2018 | Zhu et al. |
| 2018/0172998 A1 | 6/2018 | Tekolste et al. |
| 2019/0114484 A1 | 4/2019 | Keech et al. |

OTHER PUBLICATIONS

Taiwan Office Action for Application No. 112139778 dated Nov. 12, 2024.

* cited by examiner

TOTAL OR LOCAL THICKNESS VARIATION FOR OPTICAL DEVICES

CROSS-REFERENCE TO RELATED APPLICATIONS

This application claims benefit of U.S. provisional patent application Ser. No. 63/380,003, filed Oct. 18, 2022, which is herein incorporated by reference

BACKGROUND

Field

Embodiments of the present disclosure generally relate to substrates. More specifically, embodiments described herein provide for forming a substrate having a thickness distribution at one or more eyepiece areas across a substrate.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as substrate eyepieces to display a virtual reality environment that replaces an actual environment.

Augmented reality, however, enables an experience in which a user can still see through the substrate eyepieces of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

Accordingly, what is needed in the art are methods for forming a substrate having a thickness distribution at one or more eyepiece areas across a substrate.

SUMMARY

A waveguide is shown and described herein. The waveguide may include a waveguide substrate, the waveguide having a substrate thickness distribution, and an index-matched layer having a first surface disposed on the waveguide substrate and a second surface opposing the first surface, wherein: the index-matched layer is disposed over a portion of the waveguide substrate; and a device slope of a second surface of the index-matched layer is substantially the same as the waveguide slope of the first surface of the waveguide.

A waveguide is shown and described herein. The waveguide may include a waveguide substrate, the waveguide having a substrate thickness distribution; and an index-matched layer having a first surface disposed on the waveguide substrate and a second surface opposing the first surface, wherein: the index-matched layer is disposed over a portion of the waveguide substrate, and a device slope of a second surface of the index-matched layer has a slope value configured to vary the substrate thickness distribution across the index-matched layer.

A method for forming a waveguide is shown and described herein. The method may include measuring a waveguide substrate, the waveguide having a substrate thickness distribution, and depositing an index-matched layer onto a surface of the waveguide, the index-matched layer having a first surface disposed on the waveguide substrate and a second surface opposing the first surface, wherein the index-matched layer is disposed only over a portion of the waveguide substrate, and a device slope of a second surface of the index-matched layer is substantially the same as the waveguide slope of the first surface of the waveguide.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIGS. 2A through 3C are schematic, cross-sectional views of a substrate having a substrate thickness distribution.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein relate to methods for forming a substrate having a thickness distribution at one or more eyepiece areas across a substrate. Please see appendix attached.

Figure 1A:
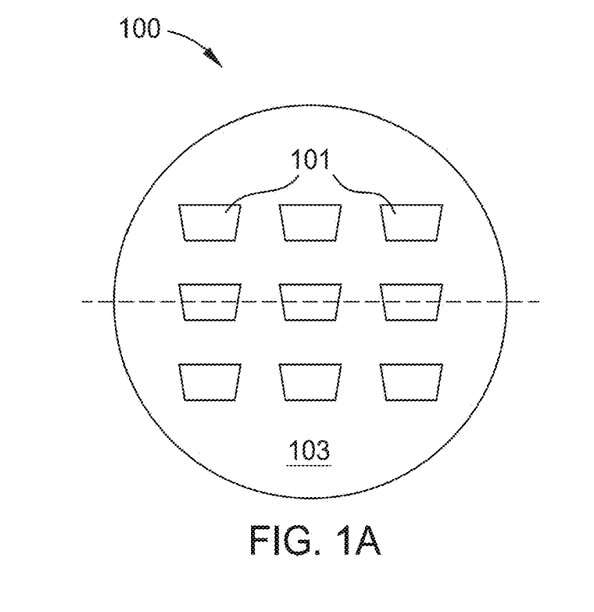
FIGS. 1A and 1B are schematic, top views of a substrate according to embodiments.
Figure 1B:
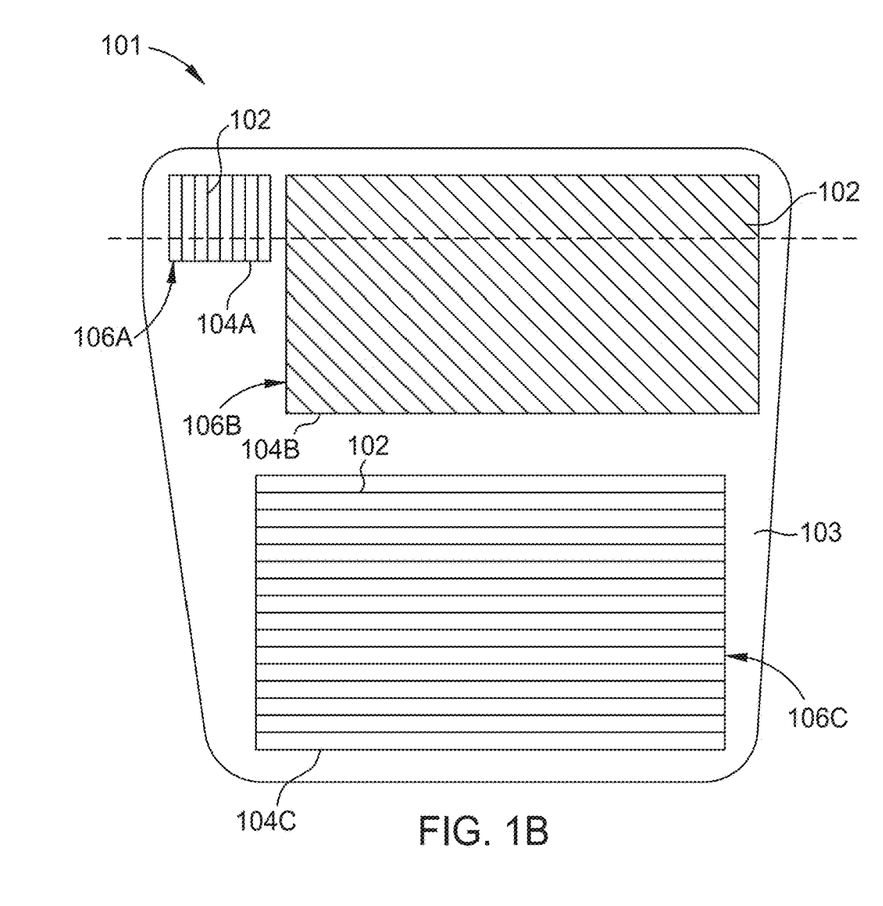

FIG. 1A is a schematic, top view of a substrate 100 according to embodiments described herein. The substrate 100 includes a plurality of waveguides 101. The waveguides 101 are areas over the substrate 100 where a waveguide 101 is to be formed. In some cases, the waveguides 101 may be an substrate eyepiece. Although only nine of the waveguide areas 101 are shown in FIG. 1A, the substrate 100 is not limited in the number of the waveguides 101 to be formed thereon. FIG. 1B is a perspective, frontal view of a substrate 100. It is to be understood that the substrate 100 described herein are exemplary substrates and the other substrates may be used with or modified to accomplish aspects of the present disclosure.

The substrate 100 includes a plurality of substrate structures 102 disposed on a surface 103 of a waveguide 101. The substrate structures 102 may be nanostructures having sub-micron dimensions, e.g., nano-sized dimensions. Regions of the substrate structures 102 correspond to one or more gratings 104 having one or more index-matched layers 106, such as a first grating 104a, a second grating 104b, and a third grating 104c. In one embodiment, which can be combined with other embodiments described herein, the substrate 100 includes at least the first grating 104a corresponding to an input coupling grating including an index-matched layer 106A and the third grating 104c corresponding to an output coupling grating including an index-matched layer 106B. In one embodiment, which can be combined with other embodiments described herein, the substrate 100 also includes the second grating 104b corresponding to an intermediate grating including an index-matched layer 106B. The substrate structures 102 may be angled or binary. The substrate structures 102 may have other shapes including, but not limited to, circular, triangular, elliptical, regular polygonal, irregular polygonal, and/or irregular shaped cross-sections.

In operation, the input coupling grating receives incident beams of light (a virtual image) having an intensity from a microdisplay. The incident beams are split by the substrate structures 102 into T1 beams that have all of the intensity of the incident beams in order to direct the virtual image to the intermediate grating (if utilized) or the output coupling grating. In one embodiment, which can be combined with other embodiments described herein, the T1 beams undergo total-internal-reflection (TIR) through the substrate 100 until the T1 beams come in contact with the substrate structures 102 of the intermediate grating. The substrate structures 102 of the intermediate grating diffract the T1 beams to T−1 beams that undergo TIR through the substrate 100 to the substrate structures 102 of the output coupling grating. The substrate structures 102 of the output coupling grating outcouple the T−1 beams to the user's eye to modulate the field of view of the virtual image produced from the microdisplay from the user's perspective and further increase the viewing angle from which the user can view the virtual image. In another embodiment, which can be combined with other embodiments described herein, the T1 beams undergo total-internal-reflection (TIR) through the substrate 100 until the T1 beams come in contact with the substrate structures 102 of the output coupling grating and are outcoupled to modulate the field of view of the virtual image produced from the microdisplay.

Figure 2A:
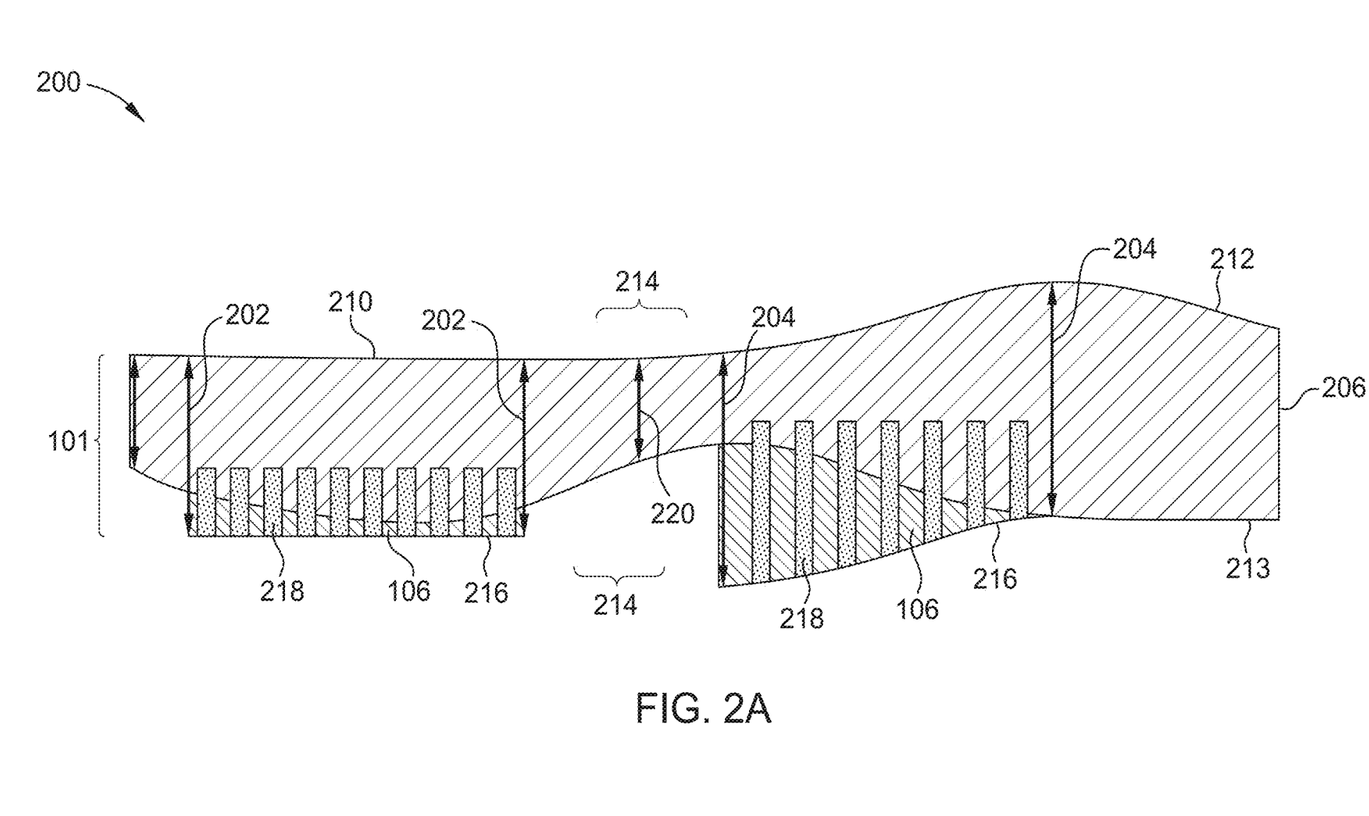
Figure 2B:
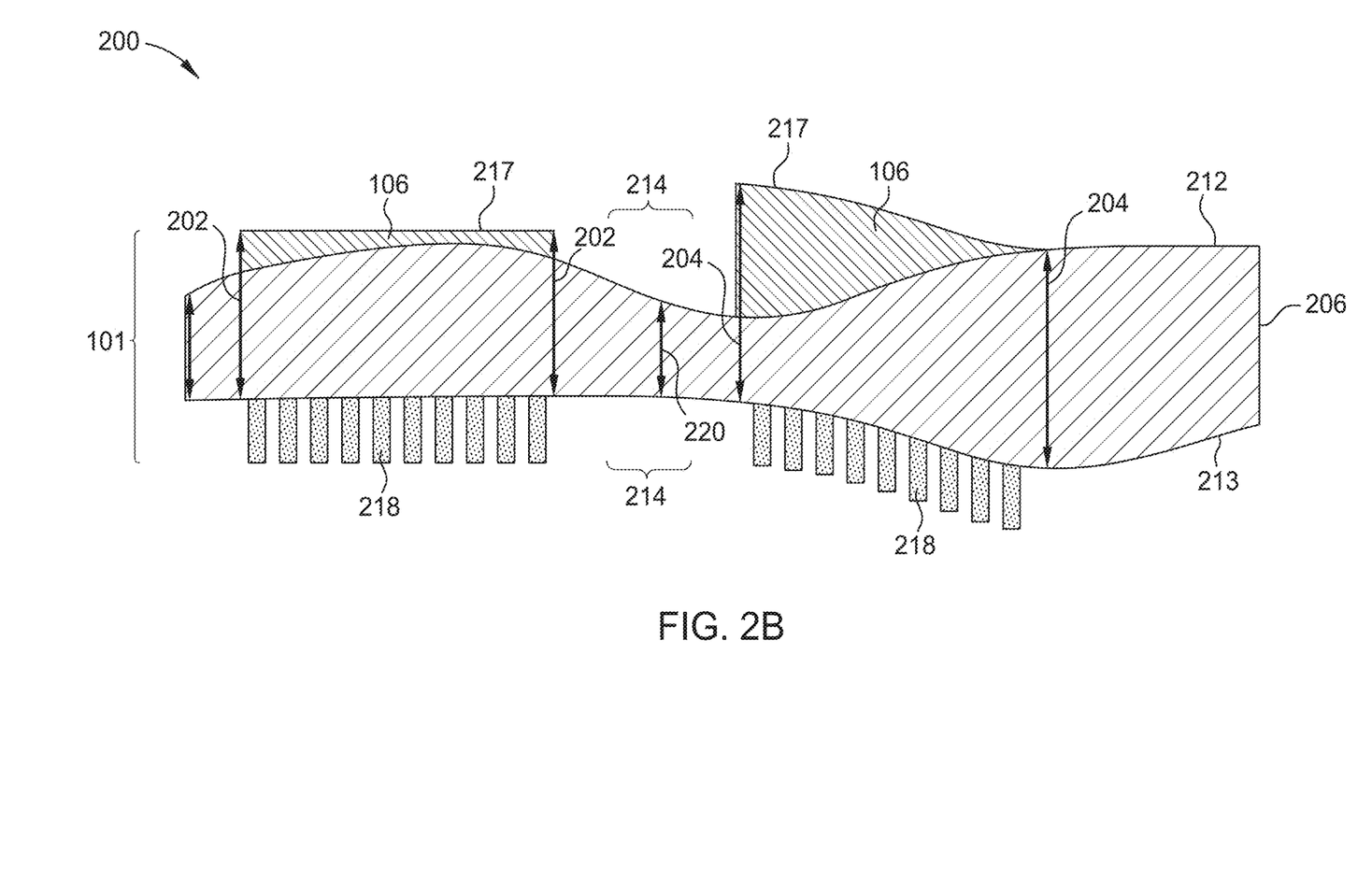
Figure 2C:
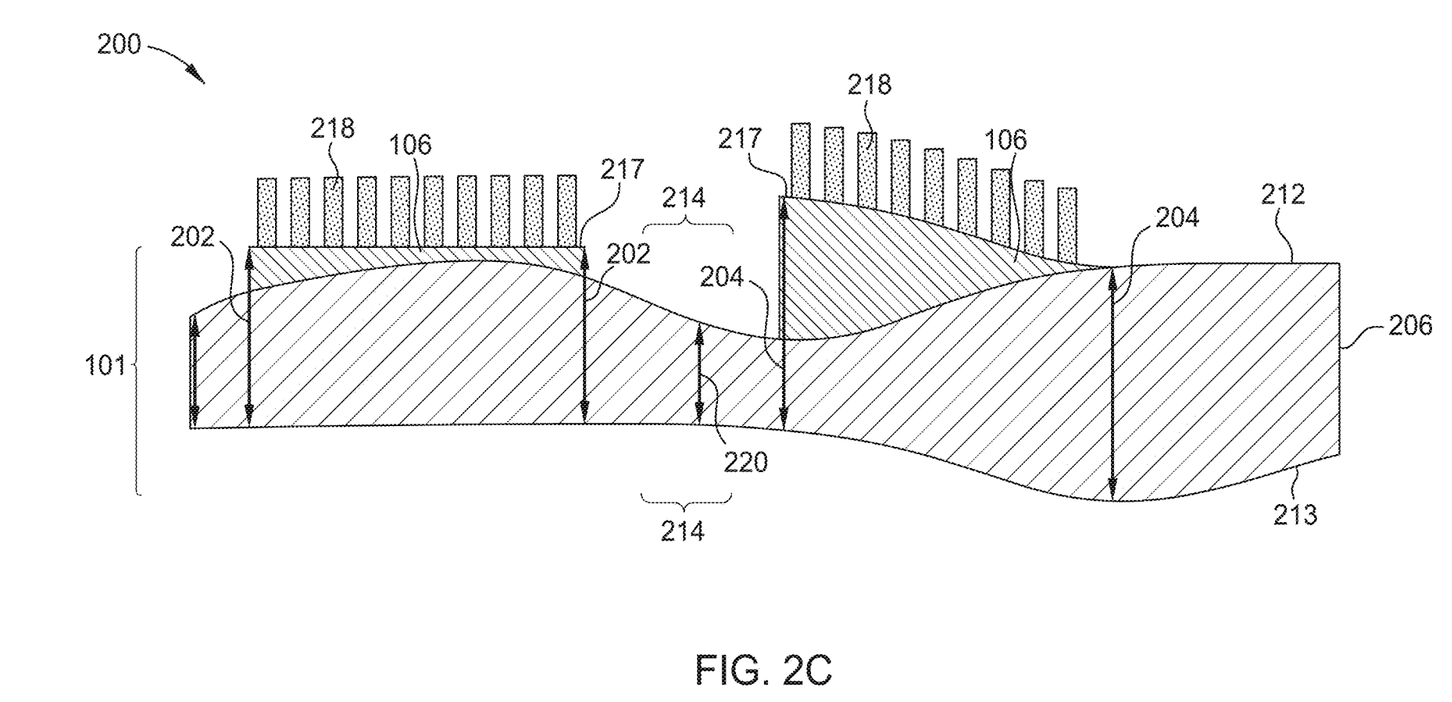

FIGS. 2A, 2B, and 2C are schematic, cross-sectional views of a substrate 200 having a first substrate thickness distribution 202 and a second substrate thickness distribution 204. The substrate 200 includes the waveguide 101 of FIG. 1 disposed across the substrate 200. Inactive areas 214 are disposed between the index-matched layers 106. The inactive areas 214 are areas of the substrate 200 that will not have one of the index-matched layers 106 formed thereon. The substrate 200 includes a base substrate 206 having a top surface 212 and a bottom surface 213.

The base substrate 206 may be formed from any suitable material, provided that the substrate 200 can adequately transmit light in a desired wavelength or wavelength range and can serve as an adequate support for the index-matched layers 106. The base substrate may be a material including, but not limited to, amorphous dielectrics, non-amorphous dielectrics, crystalline dielectrics, silicon oxide, polymers, and combinations thereof. In some embodiments, which may be combined with other embodiments described herein, the base substrate 206 includes a transparent material. In one example, the base substrate 206 and/or the index matched layer 208 includes silicon (Si), silicon dioxide (SiO$_2$), fused silica, quartz, silicon carbide (SiC), germanium (Ge), silicon germanium (SiGe), indium phosphide (InP), gallium arsenide (GaAs), gallium nitride (GaN), sapphire, or combinations thereof.

At least the index-matched layers 106 of the substrate 200 include one of the first target thickness distribution 202 or the second target thickness distribution 204. The first target thickness distribution 202 and the second target thickness distribution 204 are the local thickness distributions that have been determined to be replicated at each of the waveguides 101. The first target thickness distribution 202 and the second target thickness distribution 204 are defined by the distance between the top surface 212 and the bottom surface 213 of the substrate 200 across the waveguide 101. In FIG. 2A, the first target thickness distribution 202 and the second target thickness distribution 204 are determined by a device slope of the top surface 212 of the substrate, which is substantially the same as a waveguide slope of the bottom surface 213. The device slope may be achieved by depositing index-matched layers 106 on at least a portion of the bottom surface 213. In FIGS. 2B and 2C, the first target thickness distribution 202 and the second target thickness distribution 204 are determined by a device slope of the bottom surface 213 of the substrate, which is substantially the same as a waveguide slope of the top surface 212. The device slope may be achieved by depositing index-matched layers 106 on at least a portion of the top surface 212.

In FIG. 2A, the device slope is the slope of the bottom surface 216 of the index-matched layers 106 that are deposited to achieve at least one of the first target thickness distribution 202 or the second target thickness distribution 204. The waveguide slope is the slope of the top surface 212 of the base substrate 206. To achieve the first target thickness distribution 202 or the second target thickness distribution 204, the device slope is matched to the waveguide slope of the top surface 212 of the base substrate 206. Specifically, the device slope at any given point on the bottom surface 216 is matched to the waveguide slope at a point on the top surface 212 that is directly below the given point on the top surface 216. In FIGS. 2B and 2C, the device slope is the slope of the top surface 217 of the index-matched layers 106 that are deposited to achieve at least one of the first target thickness distribution 202 or the second target thickness distribution 204. The waveguide slope is the slope of the bottom surface 213 of the base substrate 206. To achieve the first target thickness distribution 202 or the second target thickness distribution 204, the device slope is matched to the waveguide slope of the bottom surface 213 of the base substrate 206. Specifically, the device slope at any given point on the top surface 217 is matched to the waveguide slope at a point on the bottom surface 213 that is directly below the given point on the top surface 217. By matching the device slope of the index-matched layers 106 to the waveguide slope of the base substrate surface disposed directly above or below the index-matched layers 106, the first target thickness distribution 202 or the second target thickness distribution 204 may be uniformly achieved.

The inactive areas 214 of the substrate 200 have an inactive thickness distribution 220, i.e., the inactive thickness distribution 220 does not substantially match the first target thickness distribution 202 or the second target thickness distribution 204. The inactive thickness distribution 220 is defined by the distance between the top surface 212 and the bottom surface 213 across the inactive area 214 in the inactive areas 214. The first target thickness distribution 202 and the second target thickness distribution 204 are formed from the base substrate 206 of the substrate 200 at each index-matched layer 106. In FIG. 2A, the first target thickness distribution 202 and the second target thickness distribution 204 are formed from the top surface 212 to the bottom surface 216 of the index-matched layers 106. In FIGS. 2B and 2C, the first target thickness distribution 202 and the second target thickness distribution 204 are formed from the bottom surface 213 to the top surface 217 of the index-matched layers 106.

The first target thickness distribution 202 and the second target thickness distribution 204 are engineered to improve the performance of the substrate index-matched layers 106 to be formed thereon. The first target thickness distribution 202 and the second target thickness distribution 204 are the same in at least each waveguide 101 of the substrate 200. Methods and devices described herein will provide for the first target thickness distribution 202 and the second target thickness distribution 204 to be achieved in at least each waveguide 101. In one example, matching a device slope to a corresponding wave slope to deposit a given index-matched layer 106 may enable a substantially uniform target thickness distribution. The first target thickness distribution 202 and the second target thickness distribution 204 are not limited to the first target thickness distribution 202 and the second target thickness distribution 204 shown in FIGS. 2A-2C and may be any thickness distribution determined to be suitable and improve the performance of the substrate index-matched layers 106.

At least the index-matched layers 106 of the substrate 200 may include grating structures 218. In FIG. 2A, at least one grating may be formed where grating structures 218 are in the index-matched layers 106. In FIG. 2B, at least one grating may be formed where grating structures 218 are over a bottom surface 213 of the base substrate 206. In FIG. 2C, at least one grating may be formed where grating structures 218 are disposed over a top surface 217 of the index-matched layers 106. The grating structures 218 may be disposed vertically or diagonally. The grating structures 218 may form at least one grating, which may be a pupil expansion grating, an input coupler grating, an output coupler grating, and the like.

While FIGS. 2A through 2C depict the base substrate 206 with the distance between the bottom surface 213 and the upper surface 212 of the base substrate 206 changing across the base substrate 206, in other embodiments, which can be combined with other embodiments described herein, the base substrate 206 is planar such that the distance between the bottom surface 213 and the upper surface 212 of the base substrate 206 is constant across the base substrate 206.

Figure 3A:
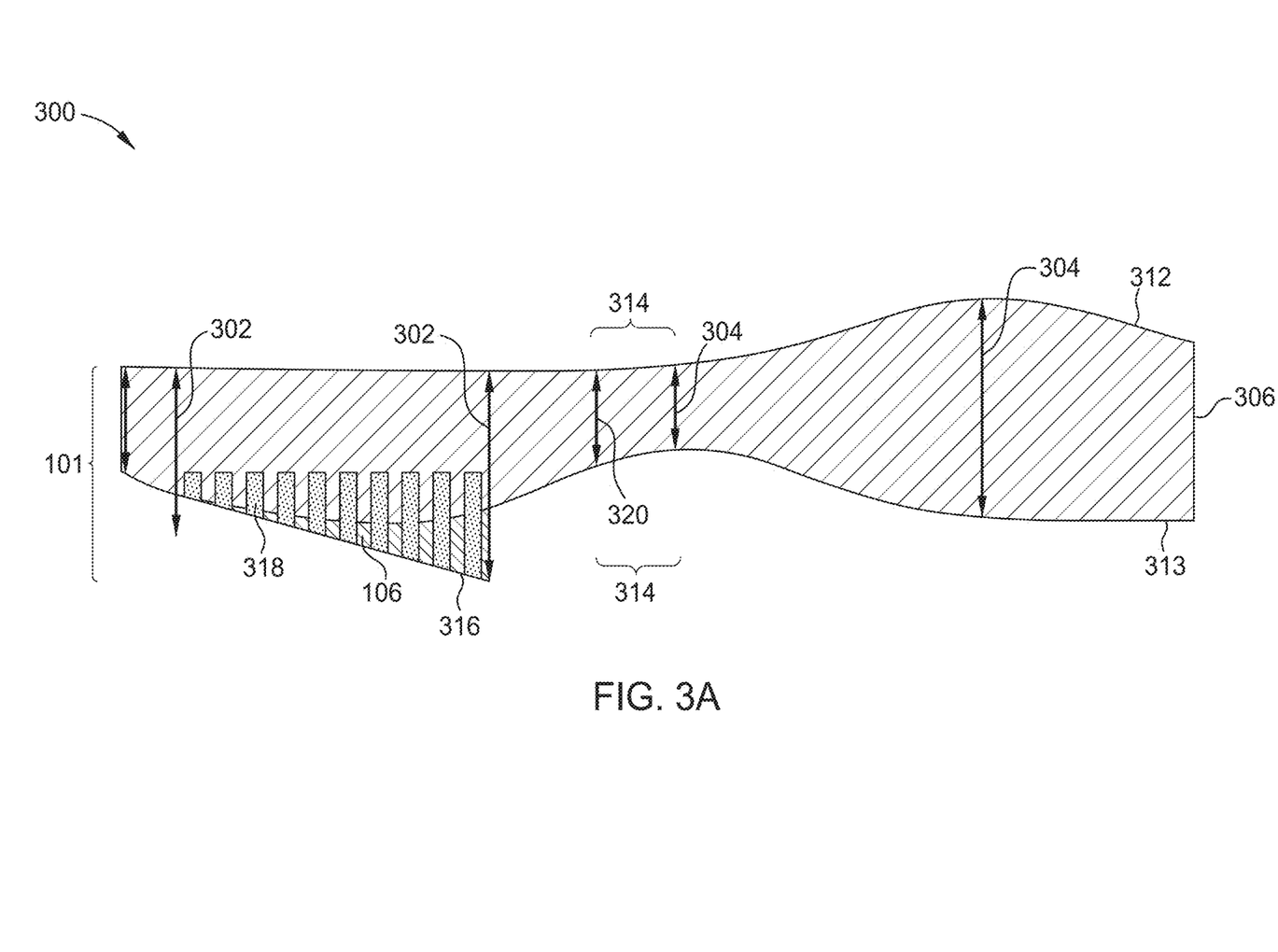
Figure 3B:
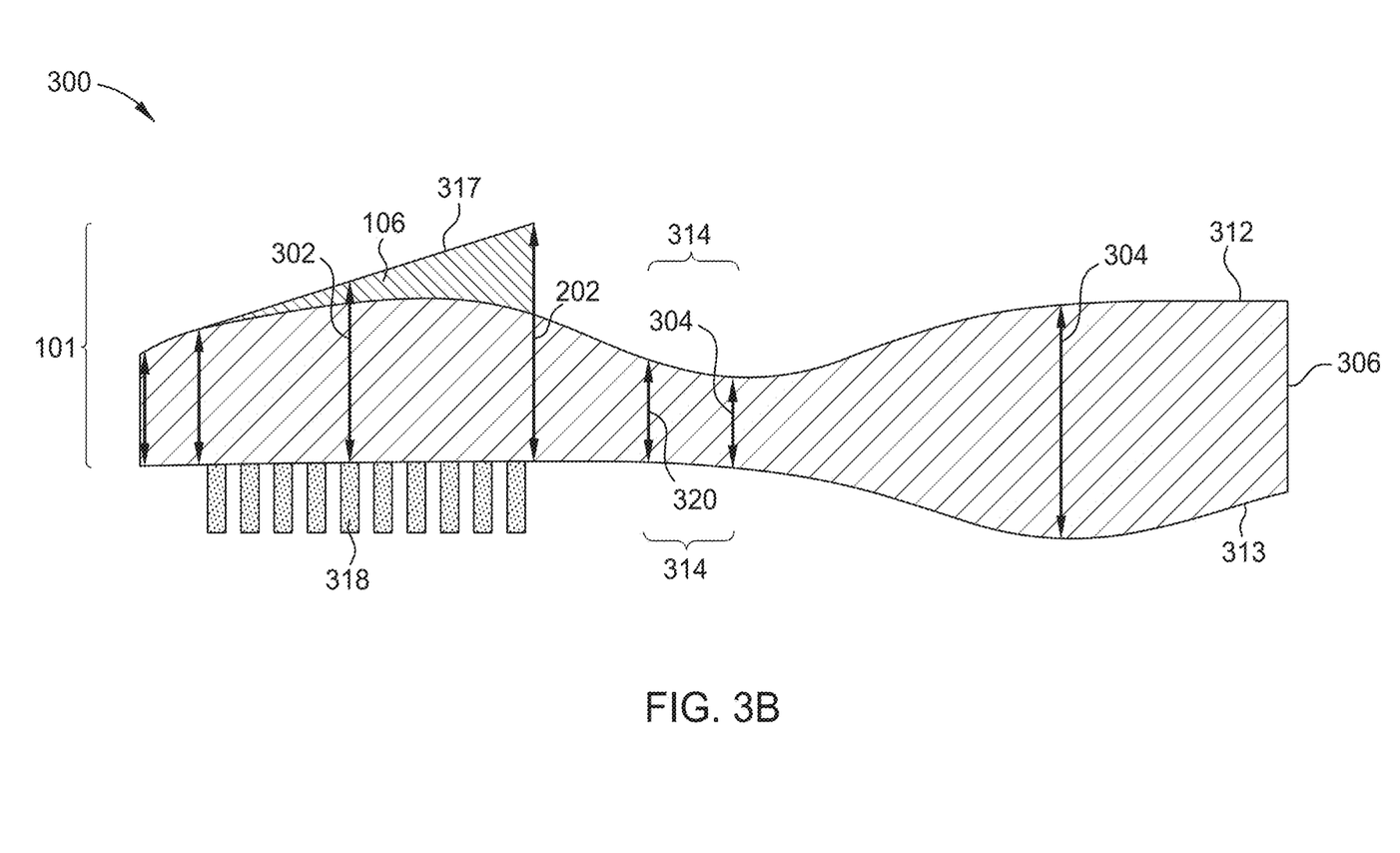
Figure 3C:
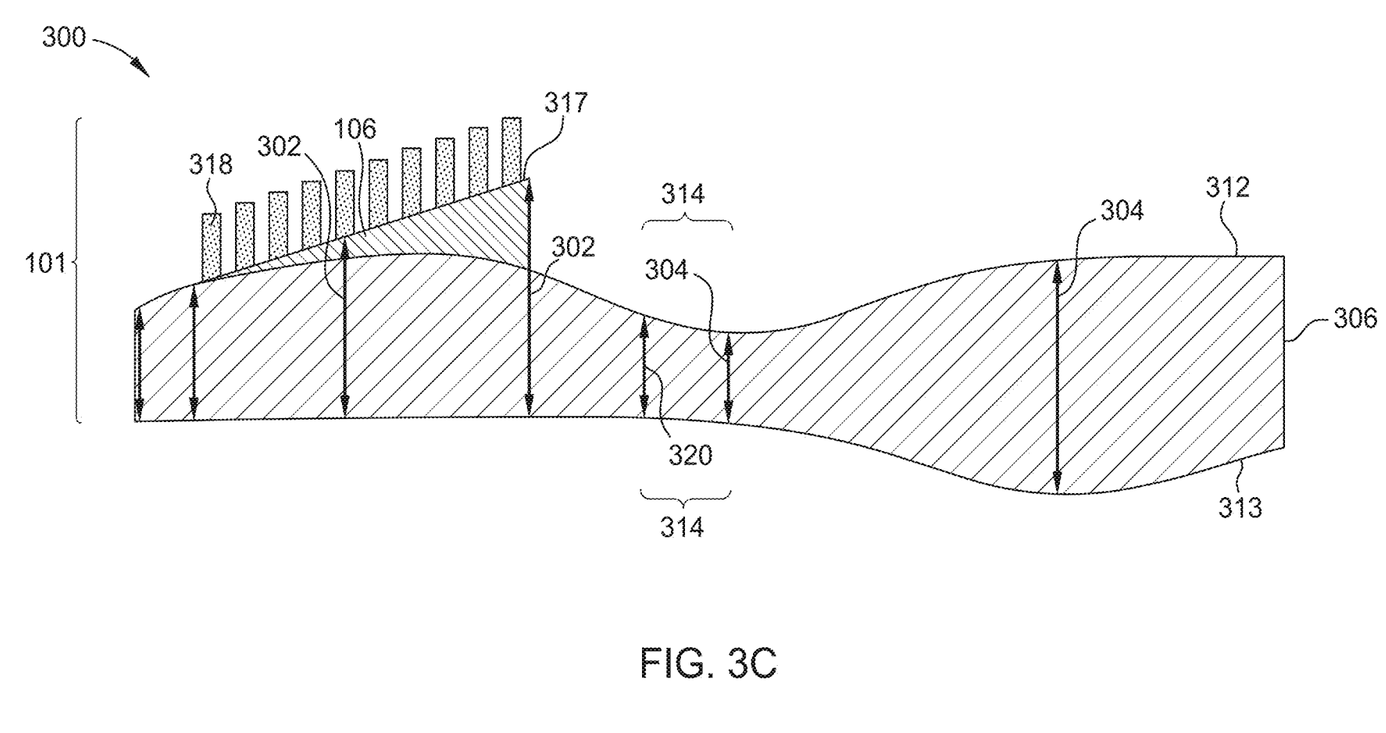

FIGS. 3A, 3B, and 3C are schematic, cross-sectional views of a substrate 300 having a substrate thickness distribution 302. The substrate 300 includes the waveguide 101 of FIG. 1 disposed across the substrate 300. Inactive areas 314 are disposed between the index-matched layers 106. The inactive areas 314 are areas of the substrate 300 that will not have one of the index-matched layers 106 formed thereon. The substrate 300 includes a base substrate having a top surface 312 and a bottom surface 313.

The base substrate 306 may be formed from any suitable material, provided that the substrate 300 can adequately transmit light in a desired wavelength or wavelength range and can serve as an adequate support for the index-matched layers 106. The base substrate 306 may be a material including, but not limited to, amorphous dielectrics, non-amorphous dielectrics, crystalline dielectrics, silicon oxide, polymers, and combinations thereof. In some embodiments, which may be combined with other embodiments described herein, the base substrate 306 includes a transparent material. In one example, the base substrate 306 and/or the index matched layer 308 includes silicon (Si), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), sapphire, or combinations thereof.

At least the index-matched layers 106 of the substrate 300 include a target thickness distribution 302. The target thickness distribution 302 is the local thickness distribution that has been determined to be replicated at each of the waveguides 101. The target thickness distribution 302 is defined by the distance between the top surface 312 and the bottom surface 313 of the substrate 300 across the waveguide 101. In FIG. 3A, the target thickness distribution 302 is determined by a device slope of the bottom surface 316 of the index-matched layer 106. The slope may be a pre-configured value, or a value determined based on the target thickness distribution 302. The device slope may be achieved by depositing index-matched layers 106 on at least a portion of the bottom surface 313 of the base substrate 306. In FIG. 3B and FIG. 3C, the target thickness distribution 302 is determined by a device slope of the top surface 317 of the index-matched layer 106. The slope may be a pre-configured value, or a value determined based on the target thickness distribution 302. The device slope may be achieved by depositing index-matched layers 106 on at least a portion of the top surface 312 of the base substrate 306.

In FIG. 3A, the device slope is the slope of the bottom surface 216 of the index-matched layers 106 that are deposited to achieve at least one of the target thickness distribution 302. To achieve the target thickness distribution 302, the device slope is matched to a desired slope value for that index-matched layer 302. A device slope of a second surface of the index-matched layer has a slope value configured to vary the substrate thickness distribution the index-matched layer. In some embodiments, the device slope at any given point on the bottom surface 316 may be a linear slope value capable of achieving the target thickness distribution 302, such that the target thickness distribution may increase or decrease laterally. In other embodiments, the device slope at any given point on the bottom surface 316 may be non-linear slope value capable of achieving the target thickness distribution 302, such that the target thickness distribution may increase or decrease laterally. In FIG. 3B and FIG. 3C, the device slope is the slope of the top surface 317 of the index-matched layers 106 that are deposited to achieve at least one of the target thickness distribution 302. To achieve the target thickness distribution 302, the device slope is matched to a desired slope value for that index-matched layer 302. Specifically, the device slope at any given point on the top surface 317 may be a linear slope value or non-linear slope value capable of achieving the target thickness distribution 302, such that the target thickness distribution may increase or decrease laterally. By defining the device slope as a target slop value, the target thickness distribution 302 may be uniformly achieved.

The inactive areas 314 of the substrate 300 have an inactive thickness distribution 320, i.e., the inactive thickness distribution 320 does not substantially match the target thickness distribution 302. The inactive thickness distribution 320 is defined by the distance between the top surface 312 and the bottom surface 313 across the inactive area 314 in the inactive areas 314. The target thickness distribution 302 is formed from the base substrate 306 of the substrate 300 at each index-matched layer 106. In FIG. 3A, the target thickness distribution 302 is formed from the top surface 312 to the bottom surface 316 of the index-matched layers 106. In FIG. 3B and FIG. 3C, the target thickness distribution 302 is formed from the bottom surface 313 to the top surface 317 of the index-matched layers 106.

The target thickness distribution 302 is engineered to improve the performance of the substrate index-matched layers 106 to be formed thereon. The target thickness distribution 302 is the same in at least each waveguide 101 of the substrate 300. Methods described herein will provide for the first target thickness distribution 302 and the second target thickness distribution 304 to be achieved in at least each waveguide 101. The first target thickness distribution 302 and the second target thickness distribution 304 are not limited to the first target thickness distribution 302 and the second target thickness distribution 304 shown in FIGS. 3A and 3B and may be any thickness distribution determined to be suitable and improve the performance of the substrate index-matched layers 106.

At least the index-matched layers 106 of the substrate 300 include grating structures 318 disposed within the index-matched layers. The grating structures 318 may be disposed vertically or diagonally within index-matched layers 106. In FIG. 3A, the grating structures 318 may extend from the bottom surface 316 of the index-matched layers 106 to above the bottom surface 313 of the base substrate 306. The coating layer 308 may be disposed over the surface 316 of the grating structures 318. In FIG. 3B, the grating structures 318 may extend from the top surface 310 of the coating layer 308, though the index-matched layers 106, to below the top surface 312 of the base substrate 306. In some cases, the coating layer 308 may optionally be disposed over the surface 317 of the grating structures 318. The grating structure 318 may be two-dimensional grating, including pupil expansion grating, input coupler grating, output coupler grating, and the like.

While FIGS. 3A and 3B depict the base substrate 306 with the distance between the bottom surface 313 and the upper surface 312 of the base substrate 306 changing across the base substrate 306, in other embodiments, which can be combined with other embodiments described herein, the base substrate 306 is planar such that the distance between the bottom surface 313 and the upper surface 312 of the base substrate 306 is constant across the base substrate 306.

Figure 4:
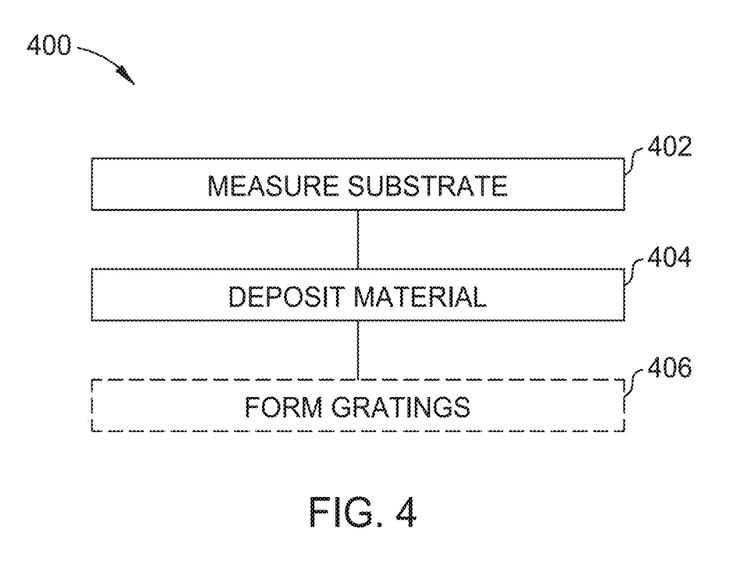
FIG. 4 is a flow diagram of a method for forming a waveguide.

FIG. 4 is a flow diagram of a method 400 for forming a substrate 100, 200, and/or 300, with a target thickness distribution 202, 203, or 302 as shown in FIGS. 2A-3C. The method 400 may be utilized to form the target thickness distribution 202, 203, and 302 in waveguides 101 and/or inactive areas 203, 304 (shown in FIGS. 2A-3B) of the substrate 100, 200, and 300.

At operation 402, a substrate 100, 200, or 300 is measured. In some embodiments, a base substrate thickness distribution of a base substrate 206, 306 is measured. The base substrate thickness distribution is defined by the distance between the bottom surface 213, 313 and an upper surface 212, 312 of the base substrate 206, 306 across the waveguide 101. The base substrate thickness distribution is a measured thickness distribution of the base substrate 206, 306 prior to forming the target thickness distribution 202, 203, or 302.

At operation 404, material for the index-matched layers 106 is disposed on the base substrate 206, 306. In some embodiments, the target thickness distribution 202, 203, or 302 is disposed according to a defined slope in accordance with FIG. 2A-3C. The target thickness distribution 202, 203, or 302 is a measured thickness distribution of the base substrate 206, 306 plus the index-matched layers 106 after to forming the target thickness distribution 202, 203, or 302. The devices layers 106 may be disposed over the upper surface 212, 312 of the base substrate 206, 306 and/or the bottom surface 213, 313 of the base substrate 206, 306 by one or more PVD, CVD, PECVD, FCVD, ALD, spin-on coating processes, or an inkjet printing process Material on which the index-matched layer may be formed may include any transparent substrate with thickness from about 150 mm or less about 50 mm or more, such as about 100 um or less to about 2 mm or more. Material on which the index-matched layer may be formed may include any substrate whose refractive index are about 1.9. Or less to about 1.3 or more, such as about 1.8. Or less to about 1.8 or more, such as about 1.6. The refractive index of the index-matched layer may be within 5% of the refractive index of the substrate. Material to be deposited on a substrate may include inkjet material. Material to be deposited on a substrate, e.g., as part of an index-matched layer, may have a refractive index from about 4.0 or less to about 0.2 or more, such as about 1.6. Material to be deposited on a substrate may include any one of the following, alone or in combination: high index nanoparticles, an organic ligand, such as a metal oxide (e.g., $SiO_2$, $TiO_2$, $ZrO_2$, $Nb_2O_5$, $HfO_2$, $V_2O_5$, $Ta_2O_5$, ZnO) metal sulfide, selenide telluride, nitride, phosphide, any core-shell structures with different compositions; ultra-violet (UV) or thermal curable resin/binders, such as acrylate based monomer, oligomers, epoxy bases monomer, oligomers, polymer or oligomers, such as silicone, novolac, PS, PMMA, polyacrylates, polymethacrylates, polyvinylalcohol, polystyrene, polyvinylpyrrolidone, polycarbonate, polyester, polyether, derivatives of components listed herein, copolymers of components listed herein; and solvents such as ethers, esters, carbonates, silanes, and any solvent whose barometric pressure is greater than about 250 C or more to about 350 C or less, such as about 300 C.

The target thickness change is utilized to determine the change to the base substrate thickness distribution that allows the target thickness distribution 202, 203, or 302 to form. Determining the target thickness change provides for the processes of the operation 204 to be adjusted accordingly to form the target thickness distribution 202, 203, or 302 as desired. FIGS. 2A-3C show the target thickness distribution 202, 203, and 302 formed in the base substrate 206, 306 of the substrate 200, 300. The substrate 200, 300 of FIGS. 2A-3C correspond to the waveguides 101 shown in FIG. 1B. The 200, 300 of FIGS. 2A-3C also correspond to the waveguides 101 and the inactive areas 214, 314 shown in FIGS. 2A-3C.

The target thickness distribution 202, 203, and 302 shown in FIGS. 2A-3C is a result of utilizing the target thickness change of the method 400. The target thickness distribution 202, 203, or 302 may be formed at each waveguide 101. Therefore, the target thickness distribution 202, 203, or 302 across the substrate 100 at each waveguide 101 is the configurable based one or more uses associated with the waveguide 101. Each waveguide 101 having the target thickness distribution 202, 203, or 302 will allow for reduced variability in the devices to be formed thereon.

At an optional operation 406, gratings may be formed on the substrate 100, 200, 300. In some embodiments, the gratings may include the grating structures 102 of FIG. 1, and the grating structures 218, 318 for FIGS. 2A-3C. The grating structures 102, 218, 316 may be formed vertically or diagonally within or over substrate 100, 200, 300. The grating structures 102, 218, 318 may be disposed over the upper surface 212, 312 of the base substrate 206, 306, over the top surface 217, 317 of index-matched layers, over the bottom surface 216, 317 of index-matched layers 106, and/or over the bottom surface 213, 313 of the base substrate 206. The grating structures 102, 218, 316 may be part of at least one grating, including pupil expansion grating, input coupler grating, output coupler grating, and the like.

While the foregoing is directed to embodiments of the present disclosure, other and further embodiments of the disclosure may be devised without departing from the basic scope thereof, and the scope thereof is determined by the claims that follow.

What is claimed is:

1. A waveguide, comprising:
    a waveguide substrate comprising:
        a first substrate surface; and
        a second substrate surface opposing the first substrate surface;
    at least one grating disposed over a portion of the waveguide substrate, a thickness of the waveguide substrate is continuously varied across the portion, the at least one grating disposed over the first substrate surface; and
    a layer disposed over the portion of the waveguide substrate, the layer comprising:
        a first surface disposed over the second substrate surface, a slope of the second substrate surface is continuously varied across the portion; and
        a second surface opposing the first surface.

2. The waveguide of claim 1, wherein the at least one grating comprises one or more grating structures disposed over the first substrate surface.

3. The waveguide of claim 1, wherein the at least one grating is a pupil expansion grating, an input coupler grating, or an output coupler grating.

4. The waveguide of claim 1, wherein a refractive index of the layer is within 5% of the refractive index of the waveguide substrate.

5. The waveguide of claim 1, wherein the waveguide further comprises an inactive area disposed on the first substrate surface of the waveguide substrate substantially adjacent to the at least one grating.

6. A waveguide, comprising:
    a waveguide substrate, comprising:
        a first substrate surface; and
        a second substrate surface opposing the first substrate surface;
    at least one grating disposed over a portion of the waveguide substrate, a thickness of the waveguide substrate is continuously varied across the portion, the at least one grating disposed over the first substrate surface; and
    a layer disposed over the portion of the waveguide substrate, the layer comprising:
        a first surface disposed over the second substrate surface, a slope of the second substrate surface is continuously varied across the portion; and
        a second surface opposing the first surface, wherein a thickness of the layer is varied to achieve a target thickness of the layer and the waveguide substrate across the portion.

7. The waveguide of claim 6, wherein the at least one grating comprises one or more grating structures disposed over the first substrate surface.

8. The waveguide of claim 6, wherein the at least one grating is a pupil expansion grating, an input coupler grating, or an output coupler grating.

9. The waveguide of claim 6, wherein a refractive index of the layer is within 5% of the refractive index of the waveguide substrate.

10. The waveguide of claim 6, wherein the waveguide further comprises an inactive area disposed on the first substrate surface of the waveguide substrate substantially adjacent to the at least one grating.

11. A method for forming a waveguide, the method comprising:
    measuring a waveguide substrate, the waveguide substrate comprising:
        a first substrate surface; and
        a second substrate surface opposing the first substrate surface;
    forming at least one grating over a portion of the waveguide substrate, a thickness of the waveguide substrate is continuously varied across the portion, the at least one grating disposed over the first substrate surface; and
    depositing a layer over the portion of the waveguide substrate, the layer comprising:
        a first surface disposed over the second substrate surface, a slope of the second substrate surface is continuously varied across the portion; and
        a second surface opposing the first surface.

12. The method of claim 11, wherein forming the at least one grating comprises forming one or more grating structures over the first substrate surface.

13. The waveguide of claim 1, wherein a thickness of the layer is varied to achieve a target thickness of the layer and the waveguide substrate across the portion.

14. The waveguide of claim 1, wherein the layer is an index-matched layer.

15. The waveguide of claim 1, wherein the layer includes $SiO_2$, $TiO_2$, $ZrO_2$, $Nb_2O_5$, $HfO_2$, $V_2O_5$, $Ta_2O_5$, ZnO, or combinations thereof.

16. The waveguide of claim 6, wherein the layer includes $SiO_2$, $TiO_2$, $ZrO_2$, $Nb_2O_5$, $HfO_2$, $V_2O_5$, $Ta_2O_5$, ZnO, or combinations thereof.

17. The method of claim 11, wherein the method further comprises varying a thickness of the layer to achieve a target thickness of the layer and the waveguide substrate across the portion.

18. The method of claim 11, wherein the layer is an index-matched layer.

19. The method of claim 11, wherein the at least one grating is a pupil expansion grating, an input coupler grating, or an output coupler grating.

20. The method of claim 11, wherein a refractive index of the layer is within 5% of the refractive index of the waveguide substrate.

* * * * *